United States Patent [19]

Melandri

[11] Patent Number: 4,568,549

[45] Date of Patent: Feb. 4, 1986

[54] WINE-MAKING PROCESS

[75] Inventor: Primo Melandri, Lugo, Italy

[73] Assignee: Diemme S.p.A., Lugo, Italy

[21] Appl. No.: 543,538

[22] Filed: Oct. 20, 1983

[30] Foreign Application Priority Data

Nov. 5, 1982 [IT] Italy ................. 46877 A/82

[51] Int. Cl.[4] ........................ C12G 1/00; A23L 1/10
[52] U.S. Cl. .................................. 426/15; 426/481;
426/482; 426/484; 426/489; 426/490
[58] Field of Search ............... 426/15, 489, 490, 481,
426/482, 484

[56] References Cited

U.S. PATENT DOCUMENTS 3,320,992  5/1967  Bodine ................. 426/489
4,238,511 12/1980  Egretier ............... 426/489

Primary Examiner—Sam Rosen
Attorney, Agent, or Firm—Birch, Stewart, Kolasch & Birch

[57] ABSTRACT

A wine-making process which comprises feeding the pressed grape at an increasing, pulsating pressure of between 7 and 13 bars to a chamber containing soft permeable walls, and then subjecting the product to an increasing, pulsating pressure between 13 and 18 bars for a time of between 12 and 16 minutes. The plant comprises a normal grape pressing-stalk stripping machine and a membrane filter press.

4 Claims, 9 Drawing Figures

WINE-MAKING PROCESS

SUMMARY OF THE INVENTION

The present invention relates to a wine-making process, or rather to the initial stages of a wine-making process for obtaining clear grape musts.

Clear grape musts, obtained by the process according to the present invention, can also be used for the production of non-alcoholic drinks, although they constitute substantially an intermediate product in wine production. According to the known art, the wine-making process always comprises at least the following operations, although with some individual modifications due to the quality and type of grape, or to local customs:

(a) a grape pressing-stalk stripping operation, during which the grapes are separated from the grape stalk, and with simultaneous rupture of the skin;

(b) a so-called "demusting" operation, in which moderate pressure is used to separate between 50% and 70% of turbid liquid containing a large quantity of suspended solid bodies due to the mechanical maltreatment to which the grapes have been subjected.

This operation is carried out by known screw machines with a perforated wall, or by known piston presses, and is effected either immediately after the grape pressing as in white wine-making processes in which fermentation is carried out in the absence of the skins, or after an initial fermentation, as in red wine-making processes, in which the skins are left for a certain time in the must in order to yield their colour.

There are various modifications to the aforesaid two wine-making processes according to the quality and type of grape, but in all cases it is an absolute requirement to obtain at the end a clear must without suspended particles, this being obtained by maltreating the grape as little as possible in order to prevent the transfer of substances or minute particles originating from the skin pulping.

These substances or minute particles are in fact the cause of highly undesirable taste defects in the final product.

Thus, in normal production processes the demusting operation must be followed by a clearing process, which can be implemented by physical-chemical methods comprising the addition to the liquid fraction of bentonites, gelatins, or silica gel, and combining their action with energetic cooling. Mechanical methods are also usually used, involving the use of filters, centrifuges and similar known apparatus.

(c) after demusting, the solid fraction undergoes high-pressure mechanical pressing, by which a further 15% to 20% of liquid is separated, obviously with much less valuable characteristics than those of the liquid from the demusting, it then being cleared by one of the aforesaid processes in that it is extremely turbid.

Thus, a liquid quantity is obtained which rarely reaches 85-90% by weight of the processed grape, and of which a considerable part is produced by final pressing, and involves the use of different costly machines, and a time varying from 3 to 7 hours according to the type of grape processed. It should be noted that the most difficult grapes to process are white grapes, including eating grapes, in which the grape itself, besides being covered by a very resistant thick skin, is in the form of a colloidal mass which spontaneously yields little or no liquid.

With this type of grape, the known wine-making methods have proved to leave much to be desired, including also the processing time that they require. In this respect, the time factor is very important as the process involves sugary liquids for fermentation, which are rich in volatile compounds and for which contact with the air always leads to undesirable oxidation.

The present invention is derived from a consideration of this state of the art, and consists of a process in which, by means of single elementary operation effected downstream of the wine pressing-stalk stripping stage and in a very short time, a perfectly clear grape must is obtained ready for subsequent wine making.

The process according to the present invention is particularly suitable for processing white or eating grapes, and for white wine making, while still maintaining all its merits and advantages for all types of grape, and also for red wine making.

The process consists of subjecting the grape to a normal stalk stripping operation, and then subjecting the stalk-free product to the action of a membrane filter press.

The particular model of filter press is not critical, provided it comprises abundant feed ducts, and means are included for preventing the return flow of the material towards the feed pump during pressing.

According to the present invention, it is very advantageous to subject the material to a pulsating action during the actual pressing.

The invention also suggests the addition to the pressed grape of filter aids in the form of powders or fibres such as those stated heretofore, this providing substantial advantages in terms of clarity.

Tests carried out on white grapes of known process difficulty, such as muscat, have resulted in yields up to 95% of clear liquid in a time of the order of 17-23 minutes, against the approximately 6 hours required by conventional methods, which also give a lower yield.

The advantages of the invention are therefore extremely important, both from the economy and quality aspects.

The cost of the machinery necessary for implementing the process is about one-third the cost of conventional machinery.

In addition to positively influencing operating costs, the lesser time employed completely overcomes the undesirable evaporation of volatile compounds and oxidation, and reduces the transfer of poor taste by the pulped skins to practically zero.

This latter important advantage is derived not only from the brevity of the cycle, but also from the fact that the skins are not mechanically stressed by rigid members such as screws, and instead are pressed between soft walls.

A final characteristic, and which is decisive in terms of the result, is the previously non-existent facility for withdrawing the pressed liquids under vacuum.

The merits and characteristics of the invention will be more apparent from the detailed description given hereinafter of a plant suitable for implementing the process according to the invention, with reference to the figures of the accompanying drawings.

The plant is described by way of a preferential but non-limiting example, as it can obviously be conceived in other ways while maintaining its substantial characteristics, as defined in the claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 shows a grape reception bin 1 of known type, in which the base screw 2 feeds the grapes to a normal grape pressing-stalk stripping machine 3. The individual grapes leave the grape pressing-stalk stripping machine 3 with their skin broken, and by means of a normal pump 4 are fed to a collection vessel 5 fitted internally with stirrer means 6 driven by a motor 7. To the side of the vessel 5 there is provided a metering feeder 13 which if required feeds powders or fibers to aid the subsequent filtration.

An enological high pressure type pump 8 feeds the product to the filter press 10, with a pressure compensation vessel 9 being connected to its feed pipe.

The feed pressure is kept between 7 kg/cm$^2$ and 13 kg/cm$^2$.

Figure 2:
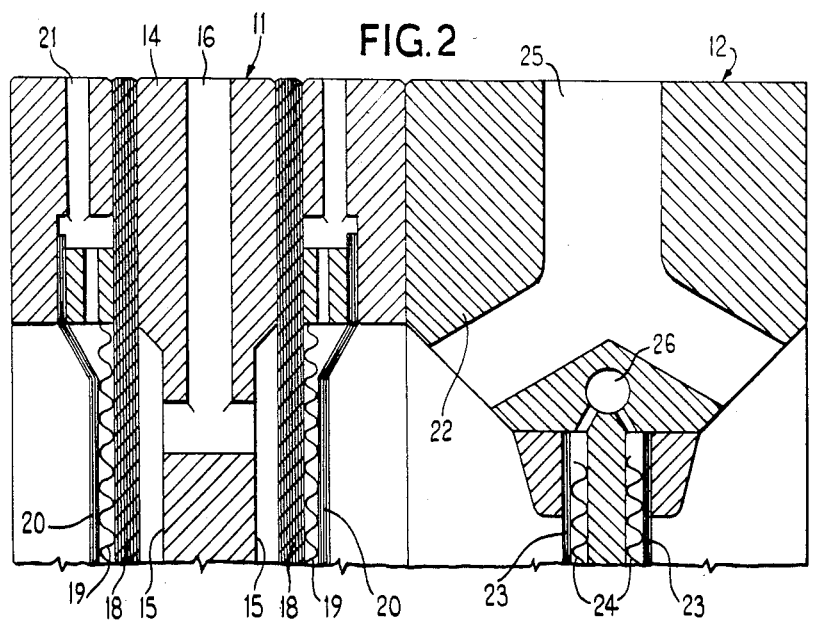
FIG. 2 is a partial sectional view of the top of two adjacent plates of the membrane press utilized.
Figure 3:
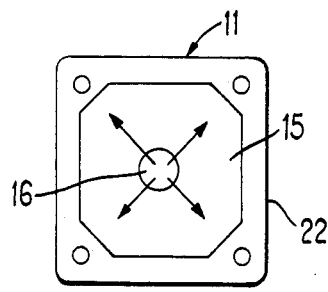
FIGS. 3 to 6 are plan views of different types of plates for this purpose, showing the bore forming the feed manifold in various possible positions.
Figure 4:
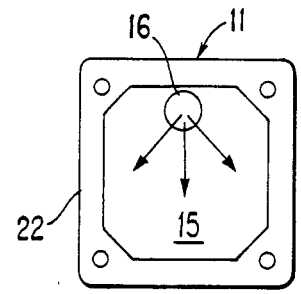
Figure 5:
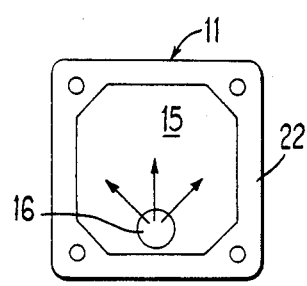
Figure 6:
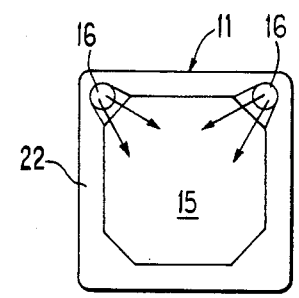

The filter press 10 is of the so-called "membrane" or "variable chamber" type, and is constituted by a bank of alternate membrane plates 11 and feed plates 12 (see FIG. 2).

Each membrane plate 11 comprises a central panel generally of diecast light alloy or of steel, plastics, fiberglass or similar material, provided with a raised edge and comprising two sunken zones 115 on its two opposing faces.

The panel comprises at least one duct 16 for feeding pressurised fluid and distributing it to said two sunken zones, as also shown in FIGS. 3 to 6.

To the sides of the panel there are disposed two membranes 18 which support the filter cloths 20 by means of support meshes 19. The zone between each membrane 15 and each filter cloth 20 communicates with the outside by way of at least one duct 21 provided in the edge 14, and through which the filtered liquid flows out.

Figure 7:
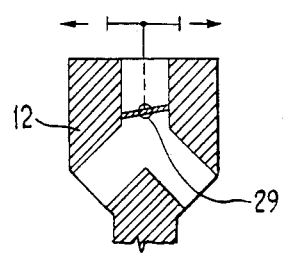
FIGS. 7 to 9 show different types of shut-off devices disposed in the pressed grape feed ducts.
Figure 8:
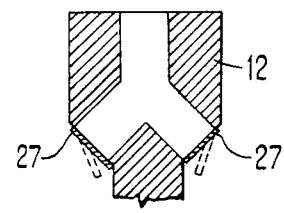
Figure 9:
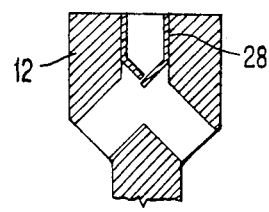

Each membrane plate 11 alternates with a feed plate 12 which is also generally of diecast light alloy or of steel, plastics, fiberglass or similar material, and comprises a completely flat panel on each side of which there is rested a filter cloth 23 by way of a support mesh 24. In the rim 22 which surrounds the panel there are provided a duct 25 for feeding the product, and at least one duct 26 connected to the zone between the filter cloth and panel, for discharging the filtrate. Non-return means are mounted in the duct 25, and can comprise a flap valve 27 (FIG. 8), a lip valve (FIG. 9), or a butterfly valve 29 operable mechanically (see FIG. 7) by means of a suitable servo-control.

The type of membrane used is not critical provided it allows ample variation of the chamber volume, made necessary by the considerable liquid fraction of the processed product.

Figure 1:
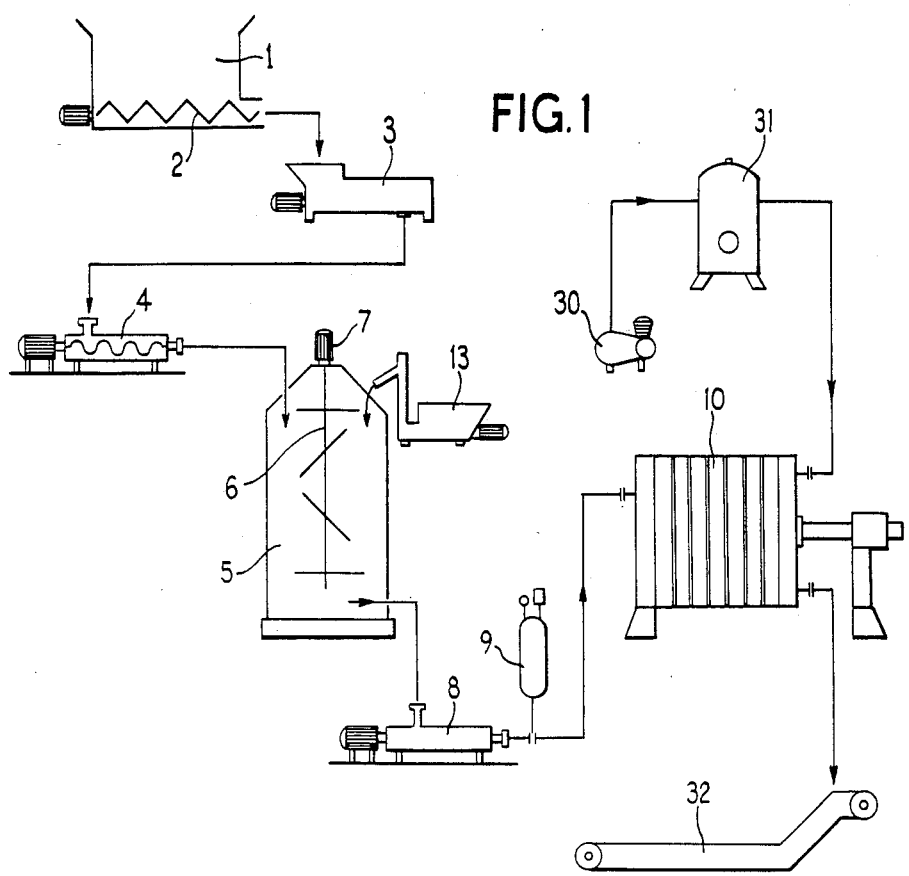
FIG. 1 is a flow diagram of the plant.

FIG. 1 also shows a compressor 30 for pressurising the receiver 31, from which the fluid which operates the press is taken. This fluid can be air or water, and is used at a pressure of between 9 and 18 bars, and which progressively increases during the cycle. A device capable of generating pressure pulsations, which can be of the diaphragm type, piston type or a simple cam which cyclically deforms the operating fluid feed pipe, is connected in series with said pipe. No description will be given as these are widely known devices.

The plant is completed by a discharge belt 32 for the solid fraction. The operation of the plant is described hereinafter in order to better define the process.

After passing through the stalk stripper, the grape free from stalks and with its grape skins ruptured is fed to the collection vessel which substantially acts both as a buffer and as a device for mixing-in the filter aids.

The product is pumped from this vessel at a pressure which induces spontaneous demusting of 30–60% of the weight of the product, according to the grape quality.

The suggested press feed pressure is between 7 bars and 13 bars, a value of 10 bars having proved effective for nearly all types of grape.

When the various membrane chambers of the press have been filled under pressure in a time of generally between 4 and 8 minutes, which includes the aforesaid spontaneous demusting, the press operating fluid is fed pulsatingly, and progressively attains maximum pressure.

The final pressing stage lasts for approximately 10 to 16 minutes, and enables up to 95% of a clear liquid fraction to be obtained, ready for subsequent processing.

On termination of the cycle, the pressure of the operating fluid is released, and the press is opened to remove the exhausted cake, after which the cycled is repeated.

By way of example, using a membrane filter press comprising plates of size 100×100 cm it is possible to process up to 25,000 kg/hour of grape, with a liquid yield of 92–96%.

The invention is not limited to the single embodiment heretofore described, and modifications and improvements can be made thereto without leaving the scope of the invention, the fundamental characteristics of which are summarised in the following claims.

What is claimed is:

1. A wine-making process of the type in which clear grape must is obtained as an intermediate product, which comprises the steps of
   (a) introducing the grapes to a pressing-stalk stripping operation wherein the grapes are stripped from the stalks and the grape skins are broken;
   (b) feeding the resulting product thus obtained under a pressure which increases to a value of between 7 and 13 bars and for a time of between 4 and 8 minutes, into a variable volume chamber with soft walls permeable to the liquid phase;
   (c) pressing and filtering the grapes under a pulsating pressure which increases to a value of between 13 and 18 bars, for between 12 and 16 minutes and recovering a substantially clear liquid fraction.

2. A wine-making process of the type in which clear fermented or partially fermented grape must is obtained as an intermediate product, which comprises the steps of
   (a) introducing the grapes to a pressing-stalk stripping operation;
   (b) fermenting the pressed grape thus obtained for a predetermined period;
   (c) feeding the fermented product thus obtained under a pressure which increases to a value of between 7 and 13 bars and for a total time of between 4 and 8 minutes, into a chamber with soft walls permeable to the liquid phase;

(d) pressing and filtering the grapes at a pulsating pressure which increases to a value of between 13 and 18 bars, and for between 12 and 16 minutes and recovering a substantially clear grape must.

3. The wine-making process as claimed in claim 1 wherein before the must pressing operation, powders or fibers are added to the product as filter aids.

4. A wine-making process as claimed in claim 2 wherein before the must pressing operation, powders or fibers are added to the product as filter aids.

* * * * *